(12) United States Patent
Sawatsky

(10) Patent No.: US 6,699,352 B2
(45) Date of Patent: Mar. 2, 2004

(54) DECORATIVE AND PROTECTIVE SYSTEM FOR WARES

(76) Inventor: Henry Sawatsky, R.R.#3, Wiarton On. (CA), N0H 2T0

(*) Notice: Subject to any disclaimer, the term of this patent is extended or adjusted under 35 U.S.C. 154(b) by 0 days.

(21) Appl. No.: 10/046,743

(22) Filed: Jan. 17, 2002

(65) Prior Publication Data

US 2002/0064616 A1 May 30, 2002

Related U.S. Application Data

(63) Continuation-in-part of application No. 09/621,956, filed on Jul. 21, 2000, now Pat. No. 6,346,315, and a continuation-in-part of application No. 09/236,372, filed on Jan. 25, 1999, now abandoned.

(51) Int. Cl.$^7$ .............................................. B41M 31/00
(52) U.S. Cl. ..................... 156/277; 156/85; 156/222; 156/219; 156/235; 156/273.3; 156/272.2; 156/DIG. 2
(58) Field of Search .............................. 156/273.3, 299, 156/219, 85, 222, 235, DIG. 2, 277

(56) References Cited

U.S. PATENT DOCUMENTS

| | | | |
|---|---|---|---|
| 6,368,758 B1 | 4/2002 | Camp et al. | 430/12 |
| 6,472,034 B1 | 10/2002 | Bourdelais et al. | 428/35.7 |
| 6,485,839 B1 | 11/2002 | Nagarkar et al. | 428/461 |
| 6,551,678 B1 | 4/2003 | O'Brien et al. | 428/44 |

Primary Examiner—Merrick Dixon
(74) Attorney, Agent, or Firm—D. W. Eggins

(57) ABSTRACT

A range of damage and wear-susceptible articles, including such as drinkware and flatware, and heat-susceptible articles, have a tough, protective plastic coating applied in sealing, protective relation with a surface portion. The protective coating may hermetically seal underlying decorative material, including toxic materials. Digital ink jet printing may be applied directly or by transfer, including pad transfer. A plastic undercoating incorporating an adhesion promoting additive may first be applied by DIJ printing or by flow coating. The impact resistance of drinking glasses can be improved ten-fold with a hard, visually undetectible 5-mil outer coating selected from polyesters and other polymers, polyurethanes and acrylates having the desired visual, toughness and bonding characteristics. With u.v. curing, high speed economic automated line production, the process is applicable to a wide range of articles.

27 Claims, 4 Drawing Sheets

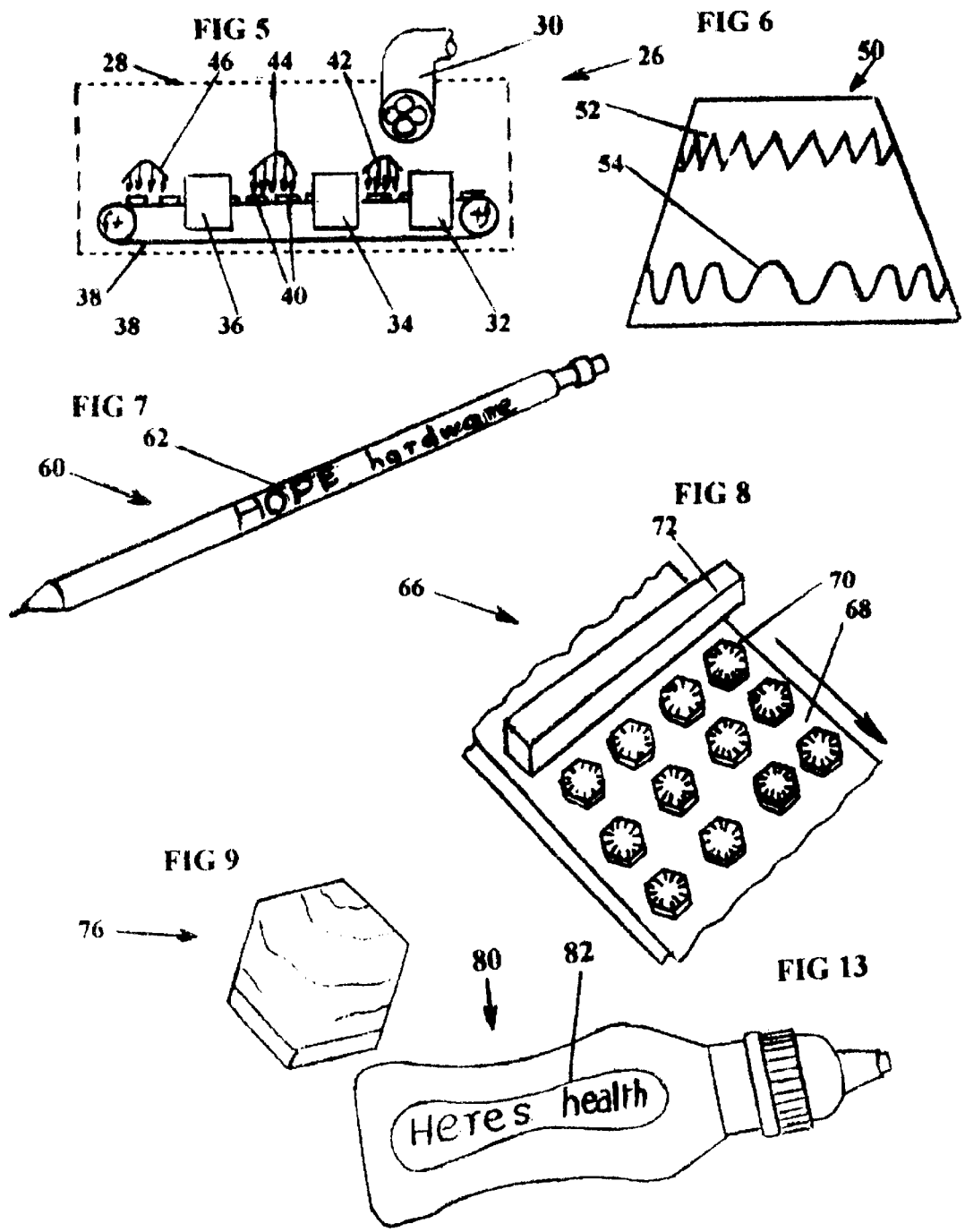

DECORATIVE AND PROTECTIVE SYSTEM FOR WARES

CROSS REFERENCE TO RELATED APPLICATIONS

This application is a Continuation-in-Part of pending Applications, Ser. Nos. 09/236,372 filed Jan. 25, 1999 now abandoned and 09/621,956 filed Jul. 21, 2000, now U.S. Pat. No. 6,346,315, which are incorporated herein, by reference.

STATEMENT REGARDING FEDERALLY SPONSORED RESEARCH OR DEVELOPMENT—NOT APPLICABLE

REFERENCE TO MICROFICHE APPENDIX—NOT APPLICABLE

BACKGROUND OF THE INVENTION

1. This invention is directed to a system for applying a protective coating to the surface of a wide range of wares that include housewares, the system including applying a protective coating over decorative material that may also be applied in accordance with the present invention; and to the wares produced thereby. The wares include frangible articles for food and drink, and a wide variety of other articles.

2. An extremely wide range of articles currently in use are susceptible to being damaged and made less useful by impact damage and surface wear. Also, the processes used in decorating such wares are frequently slow, labour intensive and costly.

Widespread use is presently made of tableware of frangible materials such as glass, china, and clay; also, stainless steel is used for serving dishes, while cutlery may be of stainless steel, or plated with chromium or even gold and silver. Such wares are in need of improved protection and lower cost decoration.

Glassware can be manufactured at low cost, is hard-wearing, sanitary, and readily washed, but is extremely frangible, and fractures with sharp edges. China wares are more expensive, but have similar characteristics to glassware. Clayware (pottery) is usually weaker than glassware, but is somewhat less dangerous when broken. This group of wares are in need of protection, to increase their strength, and to reduce the danger presented when they fragment.

The decoration of these wares is relatively expensive and somewhat limited.

In the case of articles associated with human consumption of food and drink, the available pigments that can be safely used are severely limited in number. Glass can be batch-coloured, in the melt, prior to being cast.

Surface-applied colours are legally restricted to a limiting class of non-toxic colouring materials.

Surface decorations of glass and ceramics, other than by hand-painting, are presently applied by screen printing or the use of decals, which may be preprinted on a paper or plastic film.

The inks generally need to be inorganic, in order to withstand the high firing temperatures required to fuse the coloured frit.

In the case where a ground glass frit serves as the base, this limits the quality of the print.

The screen printing process is labour intensive, as each colour of the design requires individual application, with associated high costs for screen making and set-up, while time requirements tend to be excessive.

Decals are generally applied by hand, as they usually require precise visual location. The products are then hand-loaded into a 1200 F. degree furnace, to fuse the decoration, and subsequently unloaded by hand.

The existing processes are slow, expensive and labour and energy intensive, and do not lend themselves to automation. Also, the required production facilities are both extensive and expensive.

BRIEF SUMMARY OF THE INVENTION

The present invention provides a protective and decorative system applicable to a wide variety of wares, including wares associated with the handling and consumption of food and drink, that are subject to FDA regulation.

Considering first the protective aspect of the subject process, as it applies for instance in the case of drinking glasses or tumblers.

Using the subject process, the fracture-resistance factor ("frac-R"—resistance to fracture) of a tumbler can be increased as much as tenfold in some instances, compared with the uncoated article, by the application of a relatively thick protective coating forming part of the present invention.

Alternatively, the frac-R can be increased by a more modest factor of say three to four, but with an associated improvement in the fragment-retentability characteristic of the coating, such that when fragmentation occurs, the dispersion of glass particles and shards is significantly limited.

The desired compromise between these two protective aspects can be predetermined by precise control of the thickness of the protective coating, which control is made possible by the present process.

The application of a first adherent coating to a glass surface, in accordance with the present invention facilitates the application of decoration to that surface. The coating is formulated such that, when cured, it accepts the adhesion of printing inks to its cured surface. A further protective coating of non-toxic plastic can then be applied, to encapsulate and hermetically seal the decorated surface.

One embodiment of the subject process employs flow-coating to apply one or more of the coatings. Such coatings may include tinting colours, to give the appearance of coloured glass. The tinting colour may be integrated with the first, adherence promoting coating.

This encapsulation of the applied decoration enables the use of organic colouring materials that would previously have been unacceptable from a health and safety point of view.

The subject coating process may be used in combination with many modes of printing, including a variety of digital printing processes, particularly Digital Ink Jet (DIJ) printing.

In one aspect of the present process, transfer of material to an article may involve a pad printing process.

Application by way of the present process of the subject coatings enables decorative and printed matter to be applied to an extremely wide range of materials that formerly were not readily printed upon.

The subsequent application of a bonded, protective clear coating can then hermetically seal and protect the applied decorative matter.

Such protective coatings are usually tougher than the undercoating, with a hard, abrasion resistant outer surface.

It will be understood that the terms "decoration" and "decorative matter" encompasses prosaic matter including warning notices and other text, as well as including the application of a full colour coating.

In the case of glasswares, the subject process enables the direct application of printed material to an initially plastic-coated glass surface.

In the case of items such as flatware that normally is subject to deterioration in appearance, such as the oxidation of silver, or the wearing off of silver and gold plating, or the deterioration and wear of gold ands silver articles, the application of the subject protective coating can isolate such vulnerable surfaces from oxidation and wearing contacts.

The clear nature of the available coatings renders them virtually visually undetectible to the naked eye.

For other wares having coloured, decorated or marked surfaces that are susceptible to wear or damage, the application of the subject protective coating can greatly extend the effective life of such wear-susceptible surfaces.

The subject protective coating may be an essentially water based plastic composition, preferably incorporating an adhesion promoter which promotes bonding of the coating material to the surface being coated.

Selection of coatings, for either printing upon or as an outer, protective coating is determined by the desired qualities such as Food Use approval, impact resistance, dish washer safe, surface wear resistance (hardness and toughness); etc.

In the case of an undercoating, such as a urethane, selected to receive print material (e.g. ink adhesion), the undercoating may also be selected based upon the degree of adhesion thereto of a selected protective outer coating. Furthermore, the undercoating may incorporate a background colour, usually white, to serve as a base or background for any applied decoration.

Thus, in the case of coatings being applied to receive decoration, the coating material, such as a urethane coating, is formulated to accept the decorative inks or other media that will be applied, and also to accept a hard outer coating in close-bonded relation thereto.

As an alternative to an adhesion promoting element incorporated with the undercoating, a separate adhesion promoting undercoating may be applied, prior to the application of the print-receiving undercoating (for decoration) and/or other coatings.

The respective coatings are preferably cured with ultra-violet light (u.v). In the case of the outer surfaces of drinkware, this involves the use of "food contact approved" u.v. coatings.

The range of u.v. cured protective outer coatings extends to include, but is not limited to polyesters and other polymers, polyurethanes and acrylates having the desired visual and protective qualities, and being effective in some instances at raised temperatures, some in excess of 300 F. degrees.

The adoption of the low-temperature ultra-violet (u.v) curing process makes the subject coating and decorating process applicable to plastic wares, including many thermoplastics, as well as other temperature sensitive materials, including paper, wood and many composites.

In some instances, for materials such as some plastics, an initial coating to accept ink may not be required, enabling the desired decoration to be applied directly to the surface of the plastic, as by DIJ.

In the case of glassware such as drinking glasses that are to be decorated, an initial thin printable undercoat such as urethane is applied, by flow-coating or possibly by DIJ, to a thickness in the range 0.5 to 1 mil (0.0005–0.001 inches), and u.v cured. The glass can then be printed directly by way of DIJ printing, or indirectly by transfer pad.

For flat articles, such as flatware, roller coating may be employed, in combination with u.v. curing.

Decoration can then be applied, using coloured inks if so desired, by a printing process such as digital ink jet (DIJ) printing. In some instances the decoration may be applied directly to the article.

In instances where a number of colours are involved, these may be individually applied in successive imprints, with u.v. curing after each imprint in some instances. Pad transfer may be employed both on the application of colour printing and/or coatings and for protective outer coatings.

For example, an article may be initially imprinted with a selected (frequently light) background.

The first step of decorating, such as by way of applying printed matter, is to define the precise location, shape and size of the decoration to be applied, by applying a background colour to cover the precise decoration area. This background colour is usally white, being a neutral colour, so as not to adversely affect the colours specified for application in the decoration, which will be applied on top of the background.

The artwork is based upon the designer's "Bit Map Image" [BMI], which defines the respective areas for the application of the individual colours that will constitute the final art work.

For instance, on the basis of a designer's BMI, with a specified process colour as an example, a sequence of Cyan, Yellow, Magenta and Black would each be individually printed.

Each individual colour printing would be on the precise areas programmed in the BMI for that colour.

DIJ printers lend themselves ideally to this use, being enabled by way of the present invention to print directly onto the subject article, with consequent improvements both in quality and in rate of output.

The end result is a full colour print, with the respective colours in precise registry, in accordance with the BMI.

Finally, a clear protective coat may be applied by DIJ printing in accordance with the present invention, to cover the decoration area, plus a predetermined border overlap, perhaps in the order of 0.0015 inches, to provide effective sealing of the decoration, both from a wear protection aspect of the decoration and to isolate the decorative pigment material where health requirements may be an issue.

Depending on the nature of the inks being applied, curing may not be necessary after each printing step. If so required, u.v. curing as disclosed herein provides many advantages.

The use of computer-controlled DIJ printers permit precise and ready changes such that changes to a processing line to accommodate different articles may be rapidly carried out, enabling high plant utilization, for a variety of products and decorations.

In the case of products such as ball point pens for instance, this represents a vast improvement over existing decorative processes.

Thus, a programmed design incorporating a number of different colours may be rapidly applied over a contrasting background, and receive a wear-resistant coating, in a single, short production line, using DIJ printing, with u.v. curing when required.

The application of an outer protective coating selected from the specified group of plastics may also be applied in the form of a water-based emulsion, by way of a flow coating.

A great many benefits accrue from the use of u.v. curable inks with DIJ printing. However, many of the aspects of the present invention may be applied for use with conventional DIJ inks, which do not require curing by u.v. radiation.

The outer coating can be in the order of 0.5 mil (0.0005 inches) and greater.

As u.v curing is a low temperature process, it may be used with thermally susceptible material such as paperware and plastics, including foamed plastic, and plastics that are heat shrinkable.

This capability may be combined in many instances with several varieties of DIJ printing, in the decorating and protection of an extremely wide range of products.

The adoption of u.v. curing usually implies the need for controlled ventilation, in view of the generation of fumes and vapour of limited toxicity.

With flow coating using water-based coatings, even foamed plastic bodies can be coated and decorated and/or printed upon, including the application of durable protective coatings.

In the case of decorating ceramic mugs, where fracture resistance is not a major consideration, an outer coating of 0.5 to 1.5 mil forms an adequate hermetic seal for an applied decoration, while providing effective abrasion and dishwasher (commercial type) protection.

For beverage glasses, where fracture resistance is more critical, a much thicker coating is preferred.

From experimental work with a urethane outer coating on beverage glasses, a 5-mil urethane coating provided a frac-R factor of ten or more, the coated beverage glass being at least ten times more break resistant than an unprotected beverage glass.

Upon breakage, the thus coated glass composite tended to break into large chunks.

The use of u/v curing, combined with coating materials having a very high solids content enable the achievement of significant coating thickness, as much as five to six mil (0.005–0.006 ins.) in a single pass.

It will be understood that the subject outer protective coating is substantially dishwasher-proof, in that commercial dishwashings in excess of thirty cycles fails to mar the finish or have any apparent affect on its adhesion and durability.

The coating may be transparent and present a bright and sparkling appearance, as to be visually substantially undetectable to the naked eye.

The adoption of flow coating with aqueous based coating materials enables high material utilization, with recycling of excess and spillage material, for an economically competitive product and process.

The substantial avoidance of organic solvents provides a process that is both economical and ecologically friendly, while extending the range of protectible materials, which can include foamed plastics that would be susceptible to damage from organic solvents.

The low temperature characteristics of U.V. curing furthers its use with temperature sensitive objects.

The above described characteristics enable the application of coatings for both wear and decorating upgrades to a wide field of items, including items of household and personal use, by way of high speed automated processes, thus enabling competitive pricing in the market.

Such coatings may be decorative, or clear and primarily protective. Decoration would normally also be protected with a hermetic protective overcoat. In some instances, the decoration may be plain colour.

As a further benefit, the adoption of low temperature curing by way of U.V. curing has a markedly beneficial effect on plant start-up capital requirements, as the U.V. curing is extremely rapid, with a physically short cure section, while the need for a cooling tunnel (as much as 30 feet long) in the process line, that would be required for thermal curing, is substantially eliminated, with considerable cost benefit, including diminished building size requirements.

The subject process is extremely flexible. As a for-instance: a clear or coloured primer coat, which may include an adhesion promoting component, may be applied by transfer pad to a predetermined surface area which is to be decorated, and the primer cured by u.v. light.

Such a surface may be planar or curved.

The decoration may then be applied to the prepared surface, by methods that may include DIJ printing, and variants thereof, such as pad transfer.

A protective coating that extends beyond the decoration may then be applied and u.v. cured, thus encapsulating and in most instances hermetically sealing in the decoration.

In some applications one or more of the coatings may be applied by roller coating, being particularly applicable to flat articles.

In other instances spray coating or dip coating may be utilized. Thus, bowls that are not suited to rotation upon a mandrel may be spray coated, and dip coating may well be applied to scratched bulk articles such as beer bottles, to extend their useful service life.

The printing modes used for applying decoration may include DIJ printing for a wide range of coloured inks, while ceramic inks incorporating inorganic pigments may be applied by screen printing.

The use of DIJ printing may be extended to include the application of surface coatings, such as protective, transparent coatings The foregoing wide scope of coating and decorating methods enables protective coatings, print-receptive undercoatings, and encapsulating protective outer coatings to be applied to a wide range of article shapes, including right cylindrical, conical, flat and irregular surfaces, as well as localized or "spot" surfaces.

Furthermore, the subject processes are economical in terms of material utilization, speed and plant requirements.

A great many benefits accrue from the use of u.v. curable inks with DIJ printing. However, many of the aspects of the present invention may be applied for use with conventional DIJ inks, which do not require curing by u.v. radiation.

Some examples of wares that may be protected and decorated by the subject processes include:
  Dinnerware and kitchen utensils including: glass, ceramic, plastic, pottery, china, porcelain, metal and composites in the form of plates, bowls, cups saucers, presentation plates, ornaments and figurines, etc;
  Drinkware consisting of: mugs of ceramic, glass, plastic and metal;
    wine goblets of glass and plastic;
    tumblers of glass and plastic;
    sport bottles and travel mugs of plastic
    stainless steel travel mugs
  Serverware including the above materials and also wood, as in trays, pitchers, bowls, plates, vases, candleholders, etc.

The range of products extends to include:
glass lamp shades, golf balls, coasters of ceramic, plastic and composites such as fiber-board; clip-boards, plaques, bag tags, metal name tags, promotional articles such as pens, pencils and rulers, waste baskets, timepiece faces and flowerpots and planters of pottery and plastic; and plastic foam articles such as insulator sleeves for beer cans, and utility items including mouse pads. Items such as these latter may have a protective outer plastic film laminated thereto.

The use of Digital Ink Jet printing lends itself to a range of surface applications, such that a wide variety of surface shapes may be accomodated.

DIJ printing can be applied directly to many surfaces.

In other instances where the shape of the object or the desired size of printed matter makes direct jet application impractical or uneconomic, pad printing may be used.

In one pad printing process, used for objects such as golf balls, the desired imprint is milled onto the surface of a steel plate precisely milled to the profile of the article being imprinted.

The profiled, imprinted plate is located in a pad printing machine and its surface is flooded with ink.

Excess ink is removed from the surface by way of a doctor blade, leaving just the engraved design in an ink-flooded condition. A shaped silicone pad is then applied to the engraved design, to transfer the inked design to the pad. The pad then is applied to the surface of the article, to tranfer the design to the article being imprinted.

In the case of glassware, the previously applied and cured plastic undercoat makes such transfer feasible.

In the case of DIJ printing, multiple colours may be applied simultaneously, thus obviating the former, unduly labour intensive work of re-indexing to the applicator the imprint area for each successive colour.

The jets of ink from a DIJ printing head may be directed onto a flexible silicone sheet, from which the ink pattern is then transferred to a convex shaped pad and applied by contact displacement to the desired printing area.

As referred to above, the imprinted area may have been previously prepared by the application of an ink-receptive undercoat.

Where the area of decoration is limited in size, or in accessability, the undercoat itself may also be applied by way of a transfer pad.

The rate of operation of a transfer pad sometimes exceeds the output rate of a DIJ printing head, such that a single transfer pad installation may serve a gang of DIJ printing heads, for enhanced output.

In some instances where an object, for instance a pen, has a decoration of limited size applied to the barrel, then an undercoat, if used, and the subsequent hard protective coating might employ transfer pads to apply the respective coatings. The undercoating, if required, will exceed the size of the decoration that is imprinted upon it, and the encapsulating outer coat will overlap the edges of the undercoat.

The transfer pads may be correspondingly selectively sized.

The use of roller coating may also be particularly suitable in some applications, in applying undercoats and protective encapsulating outer coatings.

For articles that can be mounted upon rotating mandrels, flow coating may be the preferred method for applying an overall coating.

In one embodiment for coating fairly thin planar articles, such as ceramic tiles, a digital ink jet printer may be used to apply both decoration and, in a separate DIJ machine or machines, any desired undercoat and/or outer protective coat may be applied. U.V. curing is readily provided, interposed between the serially arranged DIJ machines. In view of presently available DIJ machines of small size, such an arrangement may be provided as a process line located within an elongated fume cupboard, to deal with any fumes generated by the u.v. curing portion of the process.

In such an arrangement having a gang of two or more DIJ machines arranged in series, a common transfer belt may be provided, on which the articles are transferred between the serially arranged machines and through the intervening curing sections.

In such an arrangement, the capability of one machine to apply a protective coating may be used with the transfer belt itself, in an initial strengthening process, and in maintaining the belt as wear occurs.

BRIEF DESCRIPTION OF THE SEVERAL VIEWS OF THE DRAWINGS

Certain embodiments of the invention are described by way of illustration, without limitation thereto other than as set forth in the accompanying claims, reference being made to the accompanying drawings, wherein:

FIG. 5 is a side elevation of a compact DIJ printing line for coating and decorating shallow planar articles on a production line basis;

FIG. 6 is a side elevation of a glass lamp shade with decoration and protective plastic coatings applied thereto;

FIG. 7 shows a promotional article having decoration and protective coating applied thereto in accordance with the invention;

FIG. 8 shows a portion of a DIJ printing line for small articles;

FIG. 9 shows a wooden coaster protectively coated in accordance with the present invention;

FIG. 13 shows a plastic sports bottle having DIJ lettering applied to its surface.

DETAILED DESCRIPTION OF THE INVENTION

Figure 1:
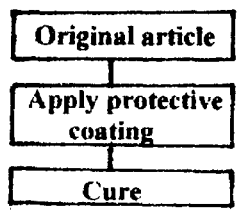
FIG. 1 shows a process flow diagram in accordance with the present invention for the application of a protective outer coat to an article.
Figure 2:
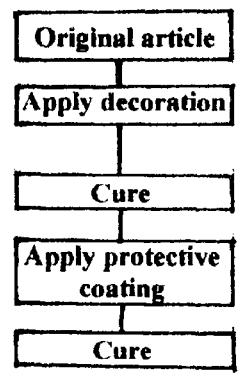
FIG. 2 shows a like process flow diagram for an article having decoration and a succeeeding protective coating applied.
Figure 3:
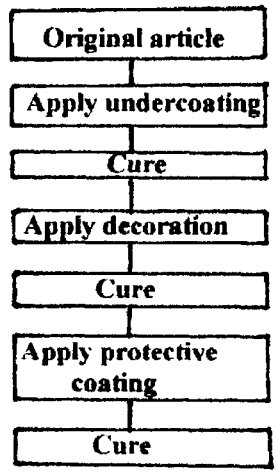
FIG. 3 shows a like process flow diagram for an article having an undercoating first applied, followed by decorative and protective coatings.

Turning first to FIGS. 1 to 3, these process schematics give the respective process steps for three different conditions.

In FIG. 1, a hard outer protective plastic coating is applied to an article. The surface of the article is compatible with the plastic being applied, such that there is bonding of the selected plastic directly to the surface of the article. Thus, the application of the protective coating is completed by a curing step.

The plastic, selected from a group that includes but is not limited to polyesters and other polymers, urethanes and acrylates, is selected for particular physical characteristics that meet the particular needs of the article being protected.

In the case of application by flow coating, a water based formulation is preferred, for the related economies and ease of application.

For application by DIJ, other formulations may be preferable. Where pad transfer is necessary, yet another formulation would probably be preferred or required.

Curing is preferably by U.V. radiation, being a low temperature process, as referred to above.

FIG. 2 relates to the provision of decoration, applied directly to the surface of the article, which is then cured; followed by the application of a protective coating that bonds to the article, effectively encapsulating the applied decoration. For example, a number of plastics, unlike glass, will accept decoration. U.V. curing enables the curing of particularly vulnerable, heat sensitive materials.

Referring to FIG. 3, certain materials, particularly glass articles generally require the application of an undercoating. This undercoating bonds with the glass, and the decorative materials bond to the undercoating. An adhesion agent may be incorporated into the undercoating, or applied separately.

The undercoating is cured, preferably by way of U.V., and decoration then applied, and cured. The area of undercoating may be restricted to provide specifically for the area of decoration being applied.

Finally, an outer, protective coating, as in the two previous embodiments is applied to encapsulate the applied decoration. Frequently, the whole article is encapsulated, particularly where the decoration includes the application of colour to the full exterior surface of the article.

Figure 4:
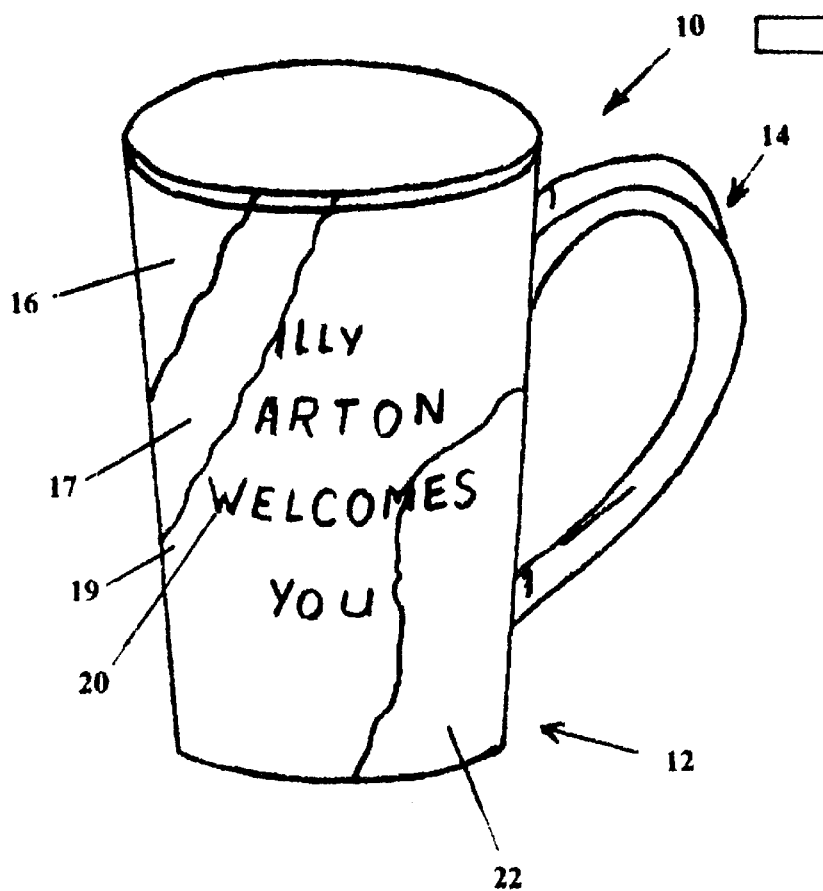
FIG. 4 shows a drinking mug having artwork and protective coatings applied thereto.

Turning to FIG. 4 of the drawings, a drinking mug 10, which may be unglazed, has a body portion 12, with handle portion 14.

The mug outer surface 16 has an undercoat 17 coated thereover, which undercoat may include an integrated adhesion promoting component.

In the illustrated embodiment a colour coating 19 is applied over the full surface of the mug, and decoration in the form of decorative lettering 20 applied thereon.

Finally, an outer protective coating 22 of high temperature plastic from the above-described group of plastics is applied to the whole outer surface of the mug body portion 12 and the handle 14.

It will be understood that as each application is deposited upon the article, that application is then cured, preferably by U.V. radiation, on account of the high production rates that can be achieved, and the other economic benefits that accrue, as described above.

Turning to FIG. 5, a compact process line 26 is mounted within a fume cupboard 28, equipped with an exhaust system 30.

The process line 26 is illustrated as having a gang of three DIJ printers 32, 34, 36 in serial arrangement, linked by way of a belt 38 upon which articles 40 pass through the printers 32, 34 and 36.

A series of three curing sections 42, 44 and 46, illustrated as being U.V. lamps, are located downstream of a respective DIJ printer 32, 34 and 36.

Turning to FIG. 6, a glass lamp shade 50, in the form of a truncated cone, is illustrated as having decoration rings 52, 54 and a protective overcoat, applied in accordance with FIG. 3, described above.

FIG. 7 shows a mass produced promotional item in the form of a mechanical pencil 60, having an advertisement decoration 62 applied and protected in accordance with the process illustrated in FIG. 3.

For areas of limited size, both decoration and protective coatings may be by transfer pad.

Referring to FIG. 8, a portion of a process line 66 has a belt 68 carrying a plurality of rows of small articles such as watch faces 70 away from a DIJ printing head 72. As in FIG. 5, a U.V. curing lamp and a succeeding second coating head (both not shown) would be followed by a final U.V. curing lamp.

FIG. 9 shows a wooden coaster 76, wherein at least one surface, and preferably the whole exterior of the coaster 76 is maintained in pristine condition by way of a protective coating or coatings in accordance with the present invention.

Figure 10:
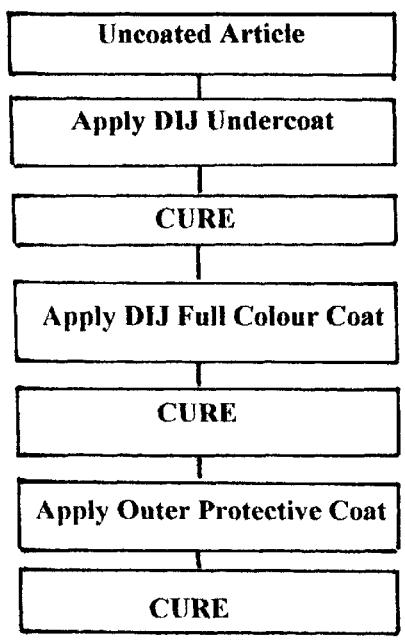
FIG. 10 shows a flow diagram dealing with applying a colour and protective coating to an article.

Refering to FIG. 10, an uncoated article has an undercoat applied thereto by way of repeated passes of a DIJ printing machine. The coating is then cured, generally using U.V. radiation.

A full area coating of a selected colour is then applied by another DIJ printing machine, and then cured.

A full area coating of an outer protective coat is then applied, by a DIJ printing machine or by another process, such as e.g. flow, dip coating or roller, and then cured.

Figure 11:
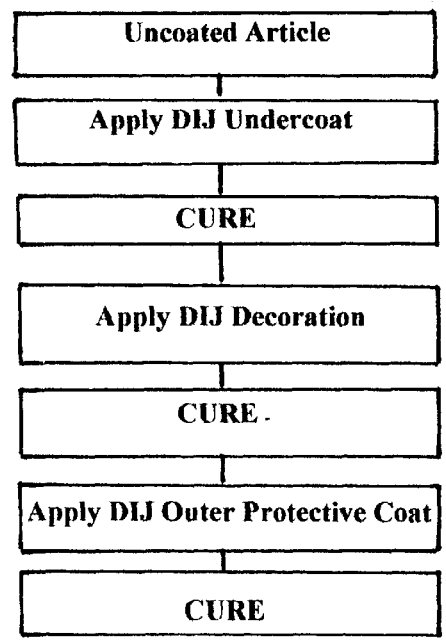
FIG. 11 is a similar flow diagram including the application of decoration to an article.

In FIG. 11, a similar process is followed, except that decoration is applied using a DIJ printer. It will be understood that the step of applying decoration may be followed in the FIG. 10 case, by way of applying the decoration to the cured full colour coat.

The outer protective coat may be applied by DIJ printer.

Figure 12:
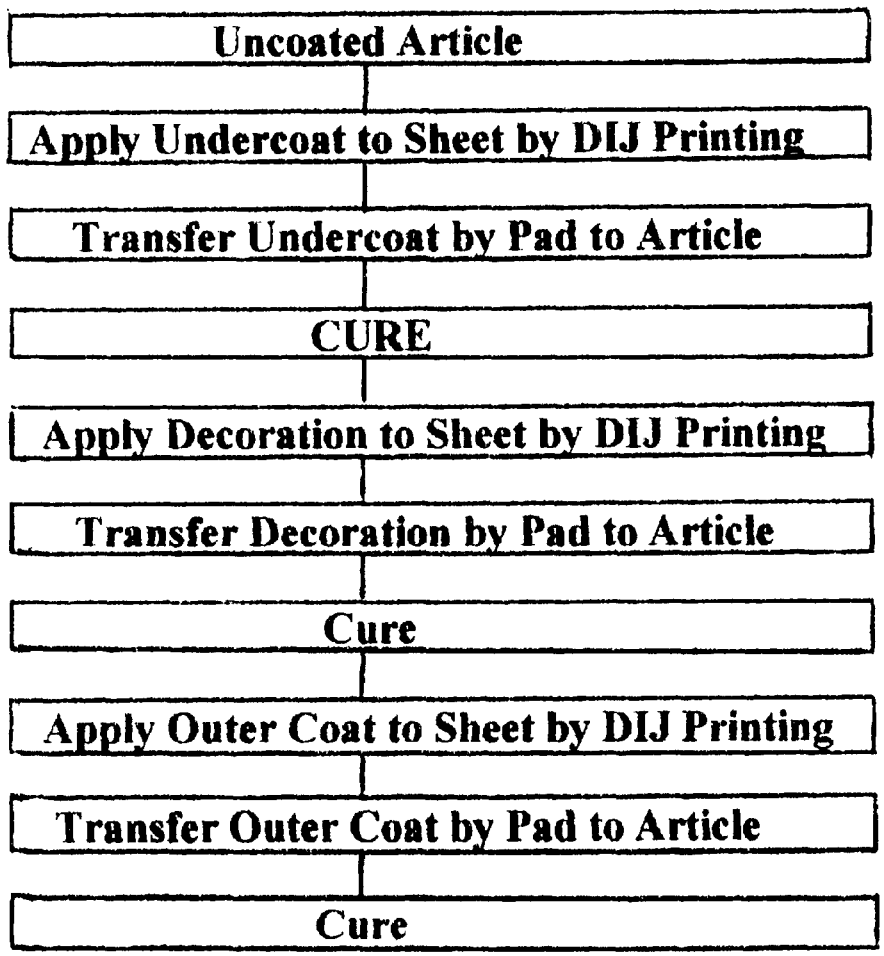
FIG. 12 is a similar flow diagram for small area application, with the use of transfer pads.

In FIG. 12, for articles having relatively small areas, a pad transfer procedure is followed, with the respective coatings being individually applied to a flexible silicone sheet, and transferred to the surface of the article by way of a suitably sized curved transfer pad. With this technique, progressively increased areas of transfer pad are used, repectively, for the undercoating and the outer protective coat, to ensure encapsulation of the desired area.

FIG. 13 shows a plastic sports drinking bottle 80 with decoration 82 applied by DIJ printing.

What is claimed is:

1. The method of treating a substantially rigid three-dimensional article, including the steps of applying a layer of predetermined thickness of tough, high temperature plastic in bonded relation to a surface of said article, in protective relation therewith, and directly applying decorative material to a surface of said article by way of Digital Ink Jet printing.

2. The method of treating a three-dimensional article, including the steps of applying an undercoat plastic layer in intimately bonded relation to a predetermined surface portion of said article, and applying at least one decorative layer of colour to a predetermined portion of said undercoat, wherein at least one said layer is applied by DIJ printing, and one said layer is substantially white.

3. The method as set forth in claim 2, wherein an adhesion-promoting substance selected from a group of adhesion-promoting silanes is applied in bonding relation to said article.

4. The method as set forth in claim 2, including the step of curing said plastic by exposure to light emission.

5. The method as set forth in claim 1, said step of applying decorative material to said article being carried out prior to the application of said protective plastic layer.

6. The method as set forth in claim 1, including the step of applying a first plastic under-layer to said article, and curing said under-layer prior to the application of said decorative material.

7. The method as set forth in claim 1, wherein the application of said protective layer is by way of flow coating over said surface.

8. The method as set forth in claim 2, wherein the step of applying decorative material to said article consists of applying a previously prepared colour pattern in predetermined positioned relation on a surface to be imprinted, and heating said article to transfer said decorative material in fused relation with said plastic underlayer.

9. The method as set forth in claim 8, wherein said step of applying material is by DIJ printing.

10. The method as set forth in claim 8, wherein said article surface is a glass surface.

11. The method as set forth in claim 5, said step of applying decorative material to said article consisting of applying a predetermined form of said material to a flexible substrate; transferring said material to a transfer pad, applying said transfer pad to said article, and transferring said material to the article.

12. The method of treating an article, by applying a coloured decoration to an external surface of an article, consisting of the steps of applying a predetermined coloured pattern to a tensioned silicone membrane by way of at least one pass of a digital ink jet printer, transferring said pattern to a transfer pad, and applying said transfer pad in pattern transfer relation with said article external surface.

13. The method as set forth in claim 12, including curing said transferred pattern, and applying a protective plastic coat to said article in substantially hermetic sealing relation with said pattern.

14. The method set forth in claim 5, wherein said decorative material is applied directly to a surface of said article, and cured, prior to the application of said protective coating thereto.

15. The method of treating an article by decorating, consisting of the steps of applying an undercoat over an exterior area of the article, directly applying at least one colour coat to at least one predetermined portion of said undercoat in predetermined decorative relation therewith; and applying a coat of tough, clear plastic over said second coat, in encapsulating, protective relation therewith, wherein at least one of said steps is followed by a curing step, and wherein at least one said applying step is carried out by digital ink jet printing.

16. The method as set forth in claim 15, including applying a third colour in pre-planned relation with said second colour prior to applying said tough plastic coating.

17. The method as set forth in claim 15, including applying a plurality of further colours in pre-planned relation with said second colour prior to applying said tough plastic coating.

18. The method as set forth in claim 15, wherein said first background colour constitutes the colour of said article.

19. The method as set forth in claim 15, wherein a background colour is applied over said undercoat, and a plurality of other colours are applied in consecutive order, each of said other colours being applied in preplanned mutual relation to form a predetermined decoration.

20. The method of treating an article by decorating, consisting of the steps of applying an undercoat over a first background colour covering at least a portion of an exterior area of the article, applying a second colour to at least one predetermined portion of said undercoat in predetermined decorative relation therewith; and applying a coating of tough, clear plastic over said second colour, in encapsulating, protective relation therewith, wherein at least one of said steps is followed by a curing step, and wherein at least one said applying step is carried out by digital ink jet printing.

21. The method as set forth in claim 20, including applying a third colour in pre-planned relation with said second colour prior to applying said tough plastic coating.

22. The method as set forth in claim 20, including applying a plurality of further colours in pre-planned relation with said second colour prior to applying said tough plastic coating.

23. The method as set forth in claim 20, wherein said first background colour constitutes the colour of said article.

24. The method as set forth in claim 20, wherein a background colour is applied over said undercoat, and a plurality of other colours are applied in consecutive order, eaeh of said other colours being applied in preplanned mutual relation to form a predetermined decoration.

25. The method of treating an article by decorating it, consisting of the steps of applying an adhesion-promoting undercoat, selected from the group consisting of clear and coloured materials, to an external surface of the article to cover at least a portion of said surface, applying a second, coloured coat to at least one predetermined portion of said undercoat in predetermined decorative relation therewith; wherein at least one of said applying steps is followed by a curing step, and wherein at least one said applying step is carried out by digital ink jet printing.

26. The method of treating an article by applying decoration thereto, wherein the colour of said article forms a first coloured part of said decoration; the method consisting of the steps of applying a second colour to at least one predetermined portion of said article in predetermined decorative relation therewith; and applying a coating of tough, clear plastic over said decoration, in encapsulating, protective relation therewith, wherein at least one of said steps is followed by a curing step, and wherein at least one said applying step is carried out by digital ink jet printing.

27. The method as set forth in claim 8, wherein said article surface is a ceramic surface.

* * * * *